H. W. WILLIAMS.
LARD DISPENSING MACHINE.
APPLICATION FILED JULY 15, 1918. RENEWED MAR. 15, 1920.

1,340,590.

Patented May 18, 1920.
8 SHEETS—SHEET 1.

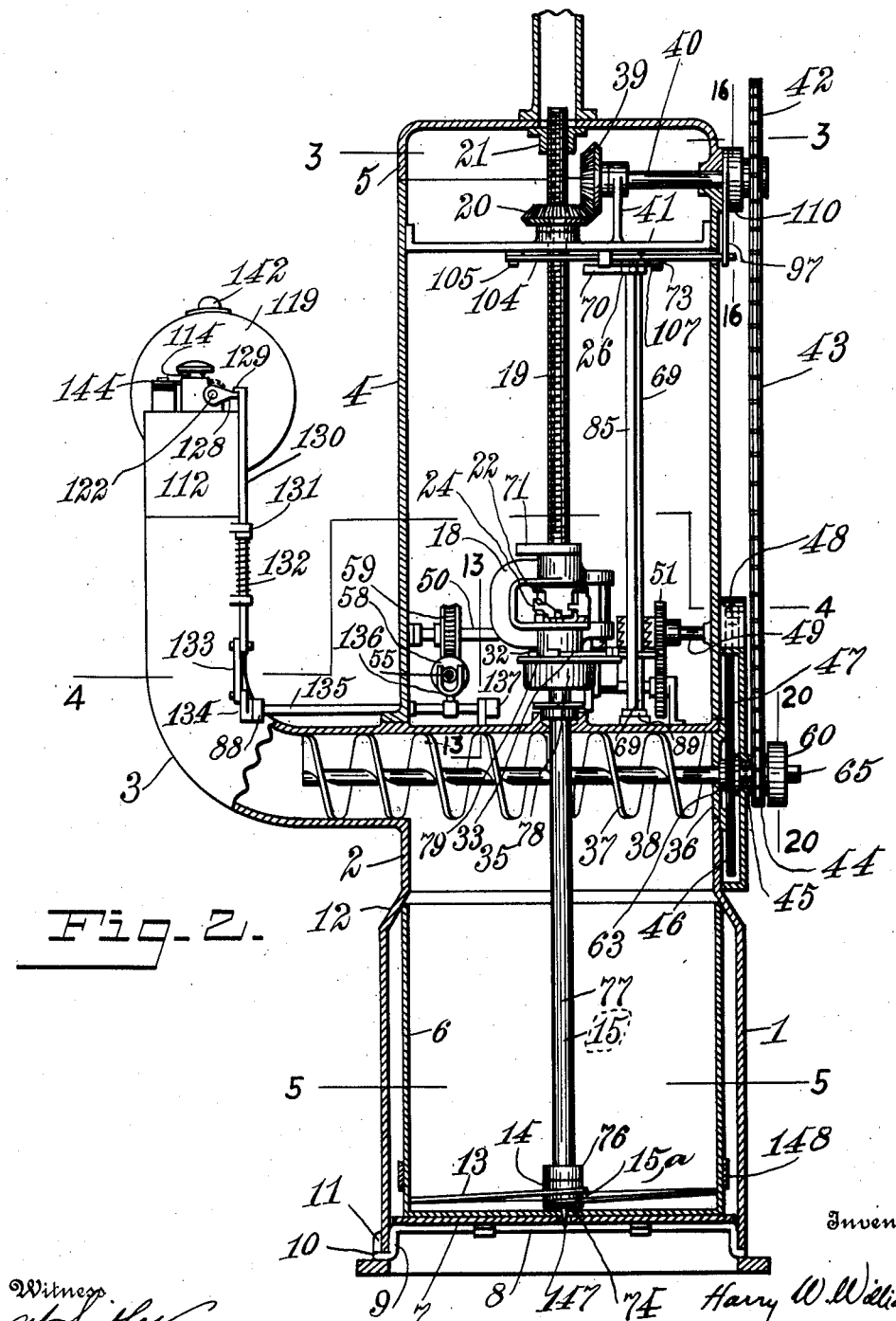

H. W. WILLIAMS.
LARD DISPENSING MACHINE.
APPLICATION FILED JULY 15, 1918. RENEWED MAR. 15, 1920.
1,340,590. Patented May 18, 1920.
8 SHEETS—SHEET 3.
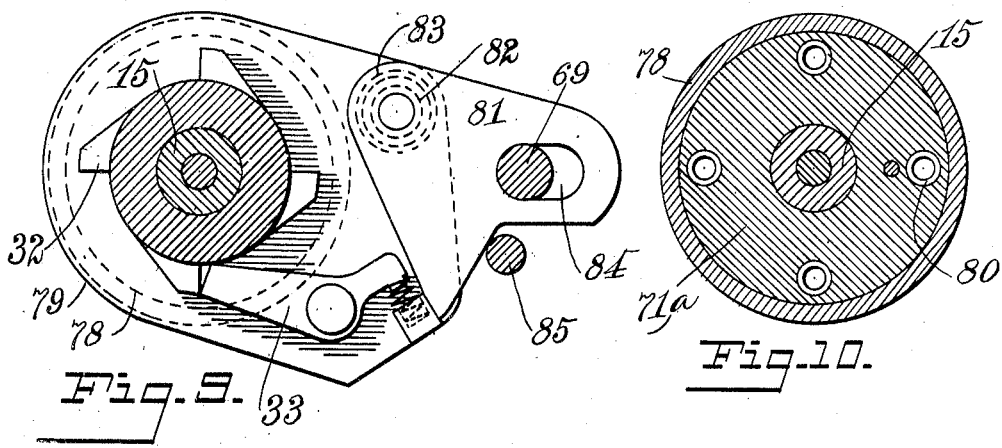
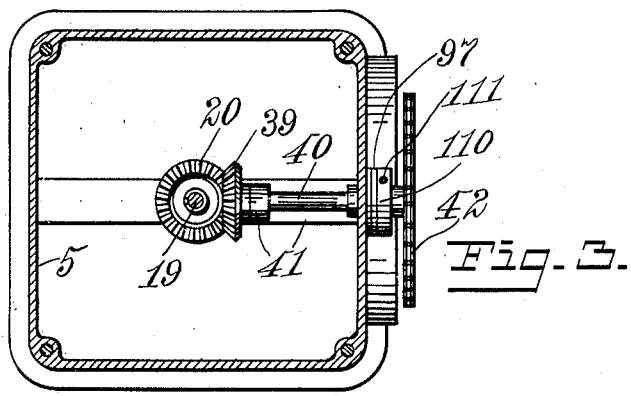
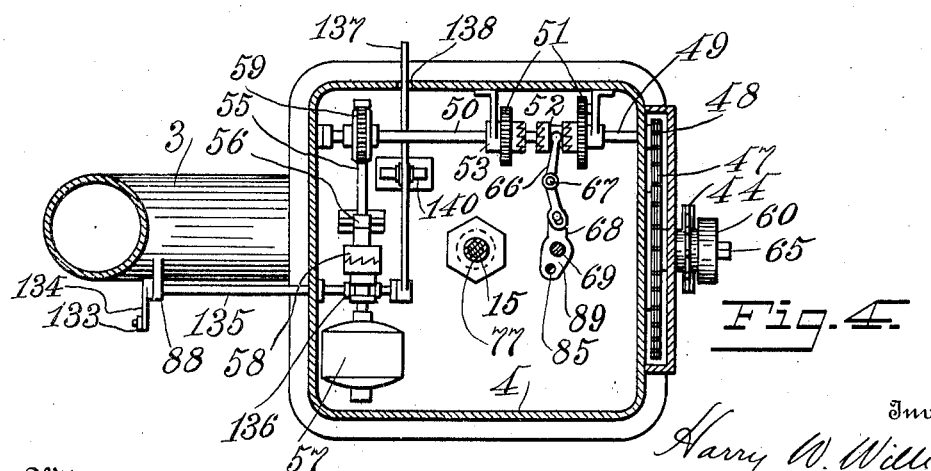
Witness
M. Liebler
Inventor
Harry W. Williams
By R. J. McCarty
his Attorney H. W. WILLIAMS.
LARD DISPENSING MACHINE.
APPLICATION FILED JULY 15, 1918. RENEWED MAR. 15, 1920.
1,340,590.
Patented May 18, 1920.
8 SHEETS—SHEET 4.
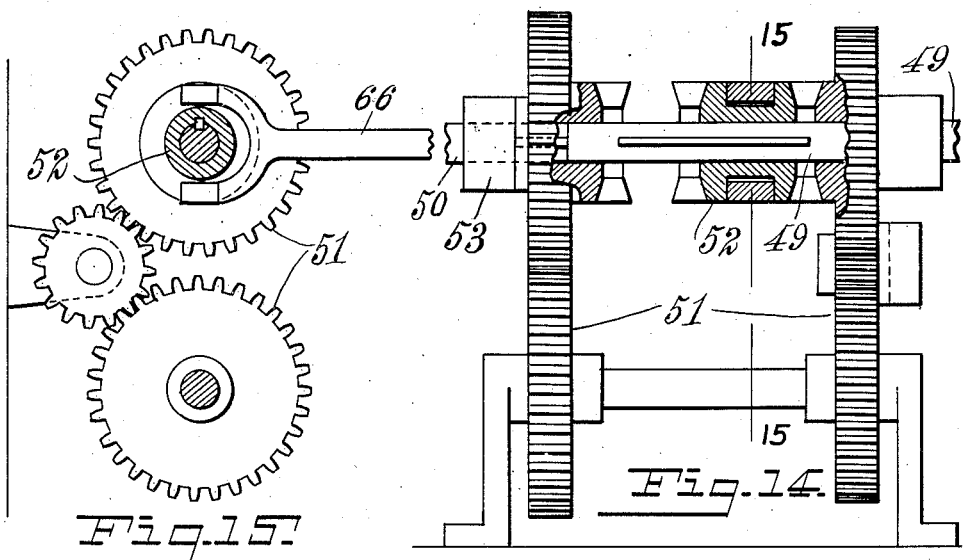
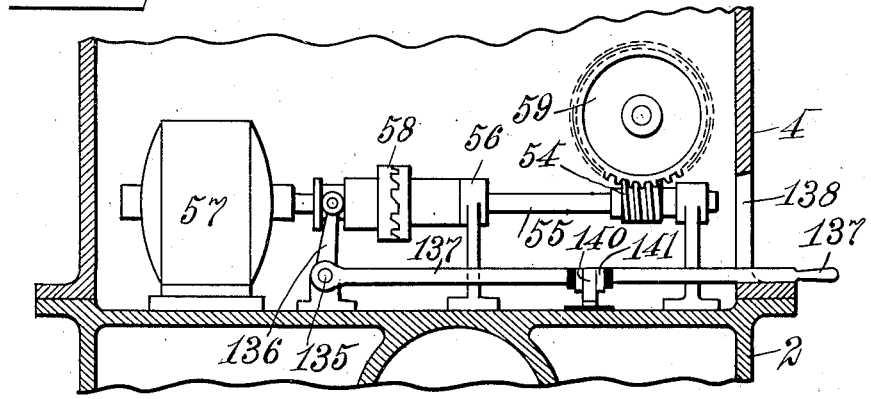
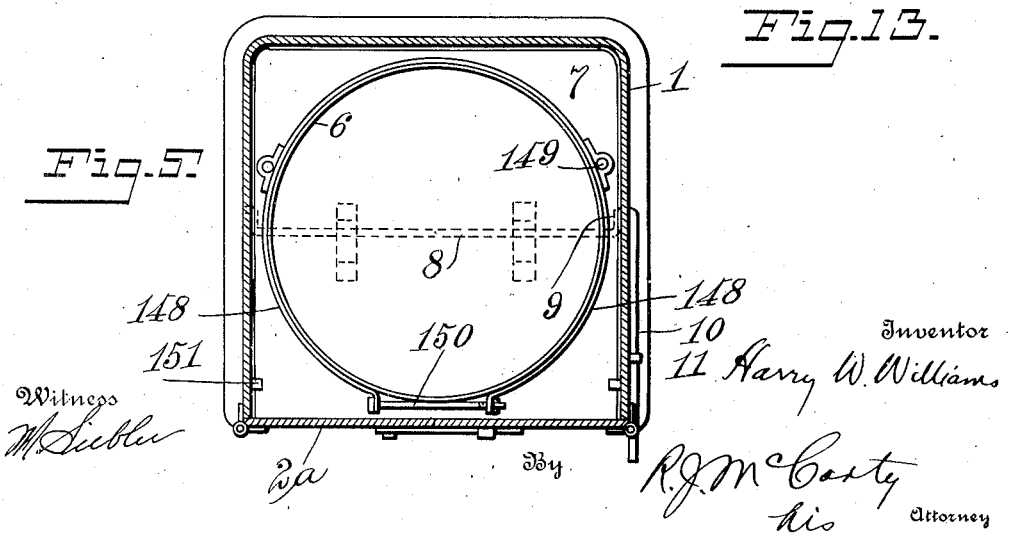
Inventor
Harry W. Williams
Witness
By R. J. McCarty
his Attorney H. W. WILLIAMS.
LARD DISPENSING MACHINE.
APPLICATION FILED JULY 15, 1918. RENEWED MAR. 15, 1920.
1,340,590.
Patented May 18, 1920.
8 SHEETS—SHEET 5.
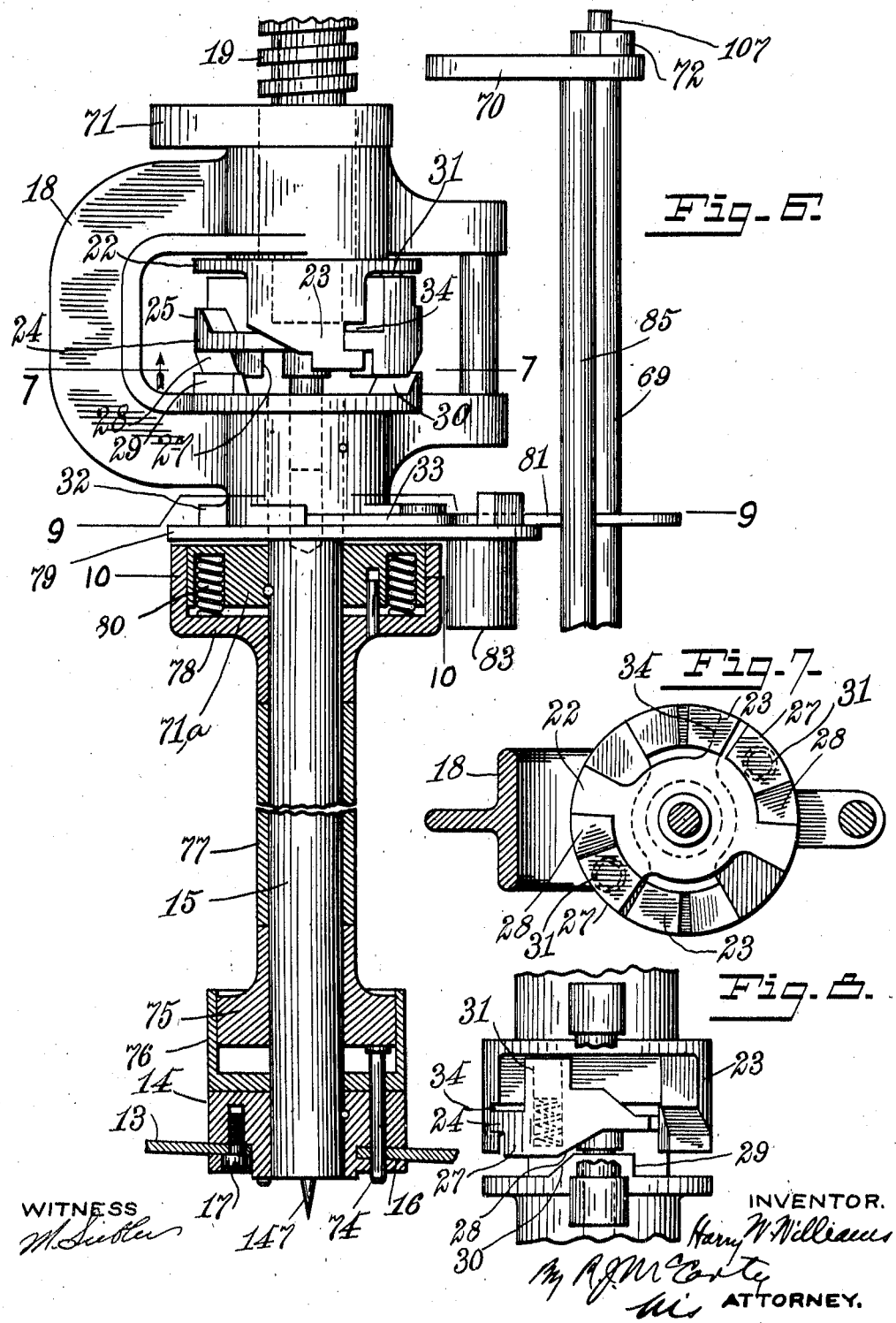

H. W. WILLIAMS.
LARD DISPENSING MACHINE.
APPLICATION FILED JULY 15, 1918. RENEWED MAR. 15, 1920.

1,340,590.

Patented May 18, 1920.
8 SHEETS—SHEET 6.

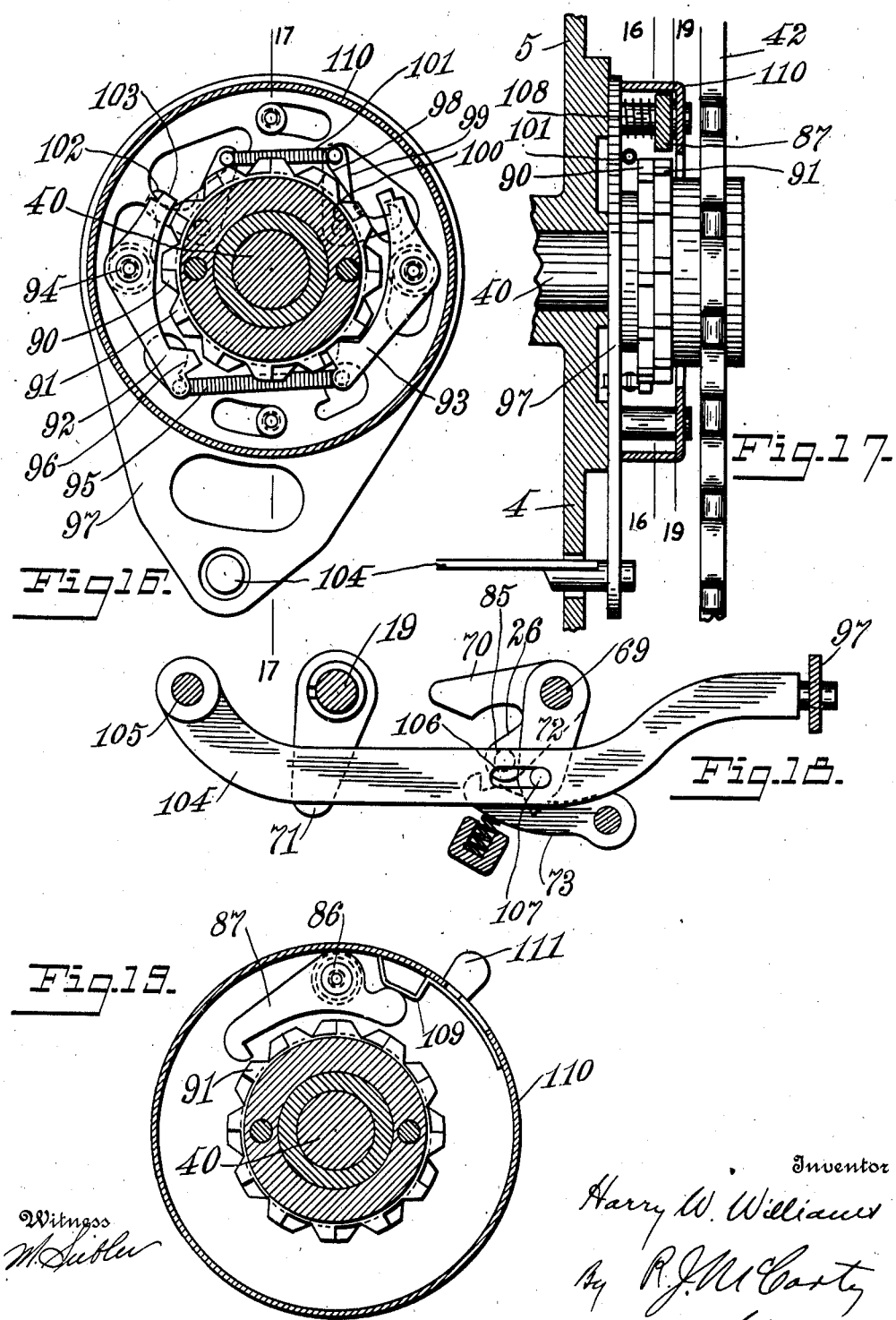

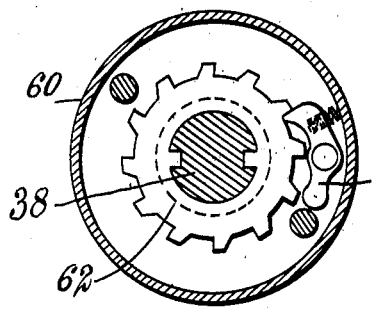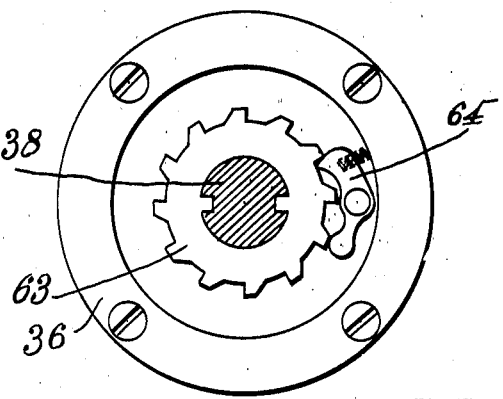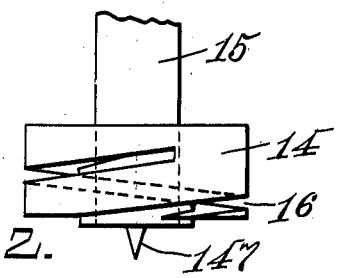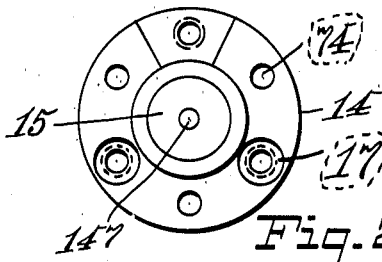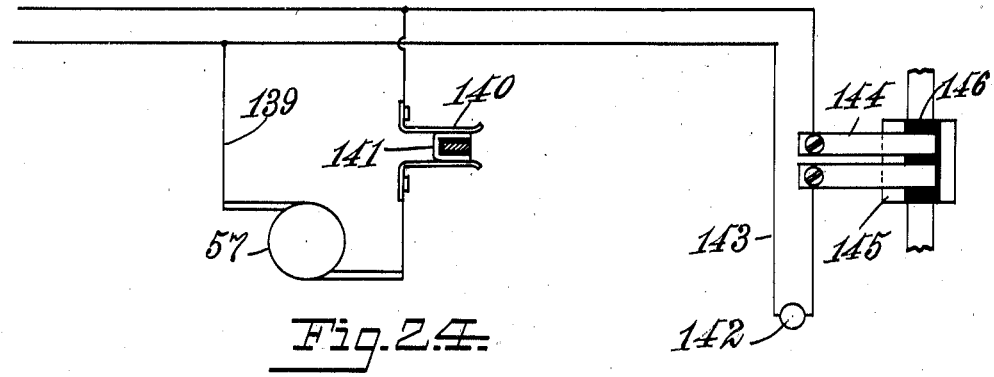

UNITED STATES PATENT OFFICE.

HARRY W. WILLIAMS, OF DAYTON, OHIO, ASSIGNOR TO THE SUPERIOR TOOL COMPANY, OF DAYTON, OHIO, A CORPORATION OF OHIO.

LARD-DISPENSING MACHINE.

1,340,590.         Specification of Letters Patent.     Patented May 18, 1920.

Application filed July 15, 1918, Serial No. 244,988. Renewed March 15, 1920. Serial No. 366,038.

*To all whom it may concern:*

Be it known that I, HARRY W. WILLIAMS, a citizen of the United States, residing at Dayton, in the county of Montgomery and State of Ohio, have invented certain new and useful Improvements in Lard - Dispensing Machines, of which the following is a specification.

This invention relates to new and useful improvements in dispensing machines of a type adapted to handle such commodities as lard in packages or retail quantities. The present invention is an improvement in the lard dispensing machine shown and described in Letters Patent issued to W. R. Mittendorf, July 22, 1913, No. 1,068,153. The objects of the invention are, first, to provide means whereby the can containing the lard is easily placed in position in the machine and is firmly secured therein during the period of removal of the lard; second, to provide means whereby the machine is adapted to be driven by power and is automatically reversible in its operation; third, to provide means for preventing a further travel of the piston in any one direction, after the said piston has reached the end of its travel; fourth, to provide means whereby the machine is automatically stopped, when a predetermined amount of lard has been delivered; and fifth, to provide improved illuminating means for the computing and indicating dial. Other objects of the invention will appear in the following specification and be particularly pointed out in the claims.

Figure 1:
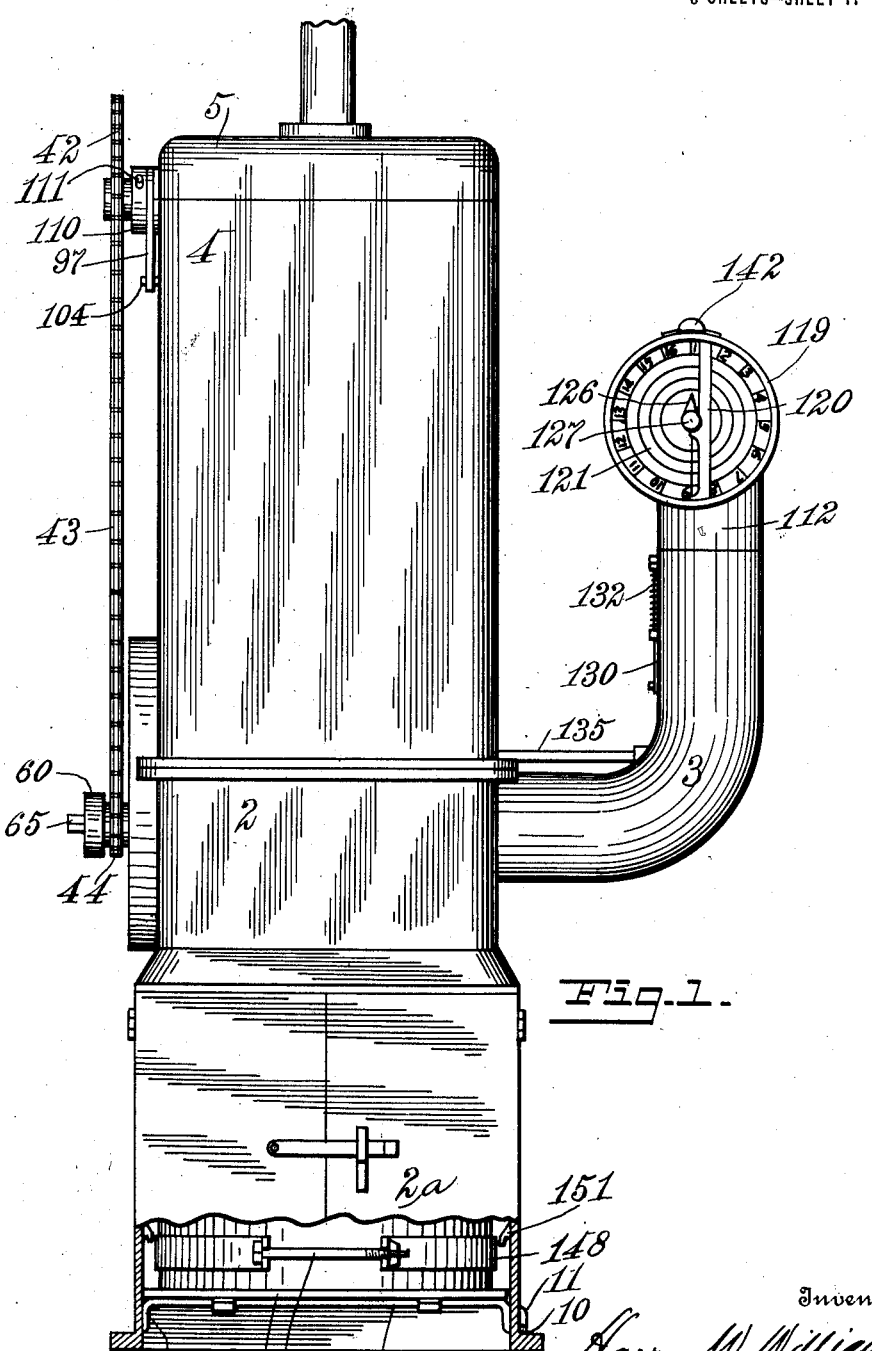
Figure 11:
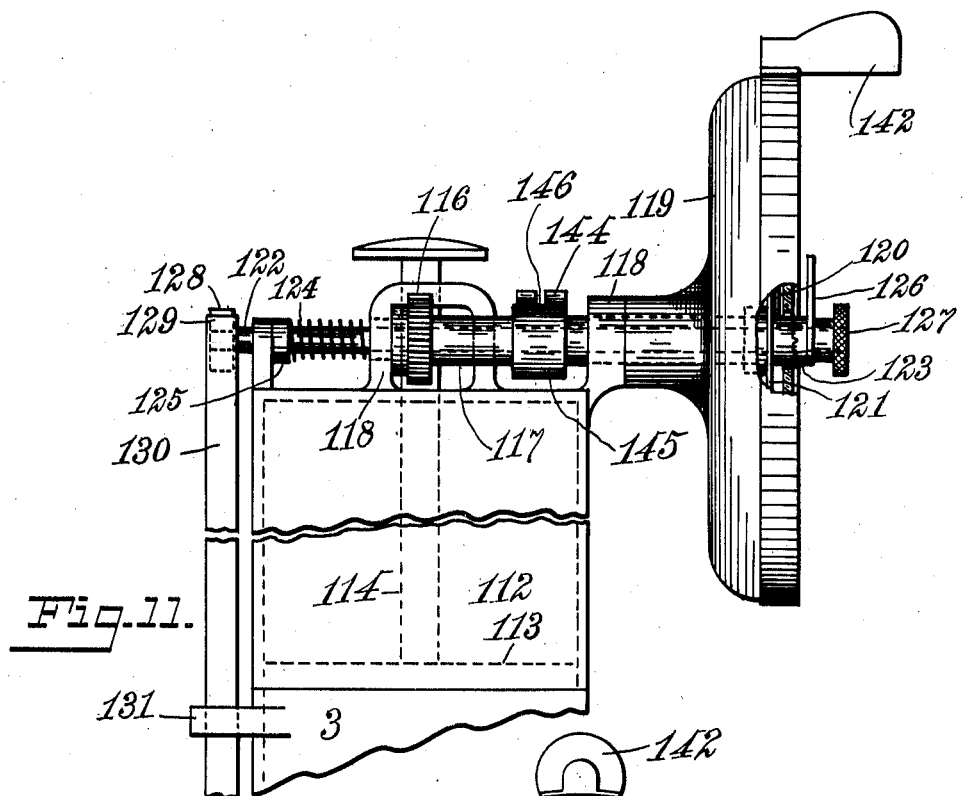
Figure 12:
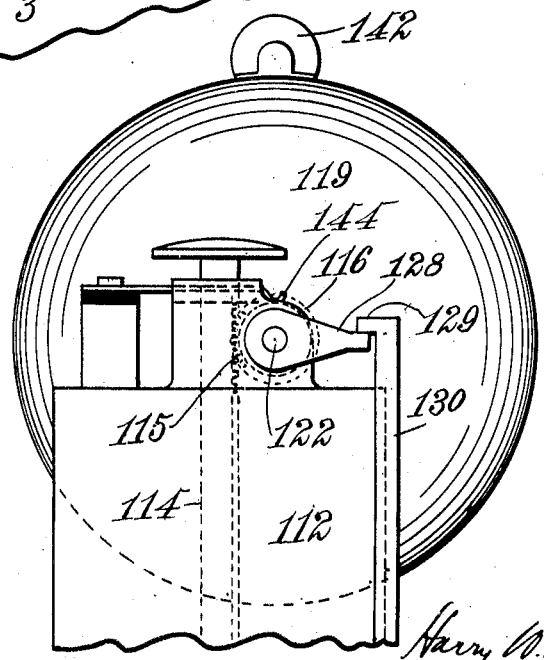

Referring to the accompanying drawings, Figure 1, Sheet 1, is a front elevation of my improved lard vending machine; Fig. 2, Sheet 2, is a vertical sectional elevation thereof; Fig. 3, Sheet 3, is a section on the line 3—3 of Fig. 2; Fig. 4, Sheet 3, is a section on the line 4—4 of Fig. 2; Fig. 5, Sheet 4, is a section on the line 5—5 of Fig. 2; Fig. 6, Sheet 5, is a detail view of the means for reversing when the piston reaches the limit of its travel in either direction; Fig. 7, Sheet 5, is a section on the line 7—7 of Fig. 6; Fig. 8, Sheet 5, is a detail view of the clutch, the same being a part of the mechanism shown in Fig. 6; Fig. 9, Sheet 3, is a section on the line 9—9 of Fig. 6; Fig. 10, Sheet 3, is a section on the line 10—10 of Fig. 6; Fig. 11, Sheet 6, is a side elevation of the measuring cup and indicating dial; Fig. 12, Sheet 6, is a rear elevation of the same. Fig. 13, Sheet 4, is a section on the line 13—13 of Fig. 2. Fig. 14 is a front elevation of the reverse gearing for the motor; Fig. 15, Sheet 4, is a section on the line 15—15 of Fig. 14; Fig. 16, Sheet 7, is a section on the line 16—16 of Fig. 2; Fig. 17, Sheet 7, is a section on the line 17—17 of Fig. 16; Fig. 18, Sheet 7, is a detail view of the tripping means for the two-way ratchet; Fig. 19, Sheet 7, is a section on the line 19—19 of Fig. 17; Fig. 20, Sheet 8, is a section on the line 20—20 of Fig. 2. Fig. 21, Sheet 8, is a detail view of the ratchet which prevents any retrograde movement of the conveyer. Fig. 22, Sheet 8, is a side elevation of the piston rod head; Fig. 23, Sheet 8, is a plan view of the same; and Fig. 24 is a diagrammatic view of the electric circuit.

Throughout the specification and drawings similar reference characters will indicate corresponding parts.

The main frame of the machine as shown in Figs. 1 and 2, consists of a square base portion 1 provided with doors 2ª which permit access to be had thereto. Above the base portion 1 is a chambered portion 2 from one side of which extends a discharge spout 3 for the lard. Above the chambered portion 2 is a housing 4 upon which is mounted a cap 5. The lard or other commodity to be dispensed is received from the packer or producer in a can or container 6 which is placed within the base portion 1. The said container 6 rests upon a platform or base plate 7 which is supported upon a yoke 8 attached to cranks 9 pivoted in the base portion 1. One of the cranks 9 is provided with a lever 10 adapted to snap under a catch 11 on the outer side of the base 1 when the can is in an elevated position. When thus elevated, the upper edge of the can abuts against a conical portion 12 thereby making a tight joint. When it is desired to insert a new can of lard the plate 7 is lowered by releasing the lever 10 which permits the can to be removed through the doors 2ª. The lard is removed from the can by a disk piston 13 which is mounted in a head 14 on the end of a piston rod 15, see Figs. 2 and 6. To permit the piston to reach the bottom of the can it is made of auger-like form, and is provided with a slot 15ª the edges of which are offset and one of which is sharpened thereby allowing the piston to auger easily through the lard, Fig. 2. The head 14 as shown in Figs. 22 and 23 is provided with a helical slot 16 into which the central portion of the piston is screwed, thereby maintaining the slot 16 open. The piston 13 is secured in the slot 16 by screws 17. When being placed in a position to dispense the lard the piston 13 is rotated and depressed but is elevated without rotation during the dispensing of the lard. This movement is secured by the following means. See Figs. 2 and 6. The upper end of the piston rod 15 is rigidly secured to a yoke 18 which in turn is freely journaled on the lower end of a screw shaft 19. The screw shaft 19 projects upward and extends through the bevel gear 20 to which it is splined and through a stationary nut 21 attached to the cap 5. The screw shaft 19 is rotated by the gear 20 and is raised and lowered, the piston rod and piston are also raised and lowered, but the rotating movement of the said screw shaft is communicated to the piston rod and piston only during the downward movement, by clutch mechanism mounted in the yoke 18 and which is as follows. See Figs. 6, 7 and 8.

Mounted on the lower end of the screw shaft 19 and within the yoke 18 is a clutch member 22 rigidly secured to the shaft. The clutch member 22 is provided with projections 23. Mounted within the yoke 18 is a floating clutch member 24 provided on its upper face with projections 25 and on its lower side with projections 27 having chamfered faces 28. The floating clutch member 24 is pressed downwardly by spring-influenced plungers 31. When the screw shaft 19 is rotated to move the same upward, the projections 23 engage the floating clutch member 24 thereby rotating the same. This rotating movement is not however communicated to the yoke and the piston rod owing to the chamfered faces 28 riding over the chamfered faces 30 of the yoke. Consequently the piston will not be rotated during its upward movement. To prevent the piston rod rotating through any possible friction during this operation the yoke 18 is provided with projections 32 which lie in the path of a pawl 33, and which will be again referred to. When the screw shaft 19 is rotated to lower the same, the projections 23 will engage the projections 25 of the floating clutch member 24 while the projections 27 will engage the projections 29 having chamfered faces 30 of the yoke thereby rotating and at the same time depressing the piston rod 15 and piston 13. To prevent the floating clutch member clattering excessively during the upward movement, one of the projections 23 is provided with a recess 34 which picks up the floating clutch member 24 when the projections 27 and 29 are top on top. The recess 34 however, permits the extreme ends of the projections 27 and 29 to lie in the path of each other, thereby allowing the clutch member 24 to be disengaged when the direction of rotation is reversed.

When the piston 13 is moved upwardly it forces the lard in the can 6 into a chamber 35 in which a screw conveyer 37 is located. One end of the said conveyer extends into the spout 3 and the said conveyer is provided with a shaft 38 journaled in a plate 36 mounted in the casing 2. The piston 13 and screw conveyer are driven by the following means. See Figs. 2, 3, 4, 14 and 15.

The bevel gear 20 is in mesh with a bevel gear 39 mounted on a shaft 40 journaled in a bracket 41 and in the top of the main casing. On its outer end, the shaft 40 is provided with a sprocket 42 around which a chain 43 extends. The chain 43 also extends around a smaller sprocket 44 mounted on a sleeve 45 journaled on the shaft 38 of the conveyer 37. The sleeve 45 carries a large sprocket 46 around which extends a chain 47 which also extends around a smaller sprocket 48. The sprocket 48 is mounted on a shaft 49 journaled in the casing. The shaft 49 is connected to a shaft 50 through any well known type of reversing gearing 51 and which in the present instance has a shiftable clutch member 52. The shaft 50 is journaled in a bracket 53 and the casing and carries a worm gear 59 in mesh with a worm 54 mounted on a shaft 55. The shaft 55 is journaled in bearings 56 and is adapted to be clutched to an electric motor 57 by a clutch 58. The motor 57 is adapted, through the reversing gear, to rotate the screw shaft 19 in both directions. The screw conveyer 37 is however, only rotated in one direction (during the upward movement of the piston 13) by the following means. See Figs. 2, 20 and 21. Attached to the sprocket 46 is a casing 60 which carries a pawl 61 in operative relation with a ratchet 62 secured to the shaft 38 of the screw conveyer 37. The conveyer will therefore be rotated in one direction only. To prevent the opposite rotation of the said conveyer, by friction for example, the shaft 38 is provided with a ratchet 63 in operative relation with a pawl 64 mounted on the plate 36. The casing 60 is provided with a square extension 65 to which a crank (not shown) may be attached and by means of which the machine may be manually operated. The shiftable member 52 of the reversing gear 51 is actuated when the screw shaft 19 reaches the ends of its travel by the following means. See Figs. 2, 4, 6, 9, 10, 14 and 18.

The said shiftable clutch or member 52 is adapted to be actuated by a lever 66 (Fig. 4) pivoted at 67 and connected to a crank 68 mounted on a vertical rock shaft 69 journaled in the casing portion 2 and the bracket 41. On its upper end the shaft 69 is provided with an arm 70 adapted to be engaged by a trip member 71 carried by the screw shaft 19. When the screw shaft is in an extreme elevated position the trip member 71 engages the arm 70 thereby shifting the clutch. The rock shaft 69 and the clutch member 52 are held in their shifted position by means shown in Fig. 18, Sheet 7. The rock shaft 69 is also provided with an extension 72 the end of which is adapted to enter the recesses in a spring controlled latch 73 which action locks the members in a well known manner. The clutch member 52 is shifted in the opposite direction when the screw shaft reaches the other limit of its travel by the following means.

Mounted in the piston head 14 are pins or actuators 74 which are adapted to engage the bottom of the can which forms a rigid abutment. The pins 74 press against a head 75 slidingly mounted in a cup 76 and on the piston rod 15. The head 75 when thus actuated through contact of the pins 74 with the bottom of the can, presses against a sleeve or connecting member 77 on the piston rod 15. This movement in turn is communicated to a cup 78 also mounted on the piston rod and adapted to press against and rock a plate 79. The cup 78, sleeve 77, head 75 and pins 74 are pressed away from the plate 79 by springs 80 mounted in a disk 71ª rigidly secured to the piston rod 15 within the cup 78. The plate 79 is pivoted on the piston rod 15 and has pivotally attached thereto a plate 81 which is held in the relative normal position shown in Fig. 9, Sheet 3, by a spring 82 inclosed in a housing 83. The plate 81 is provided with an oblong opening 84 which receives the rock shaft 69. The rock shaft 69 is instrumental in preventing the plates 79 and 81 completely rotating, said plates having only a rocking movement. The pawl 33 before referred to, is mounted on the plate 79. The said plates 79 and 81 constitute a toggle and the plate 81 is adapted to engage a rod 85 which lies parallel with the rock shaft 69 and is connected thereto at top and bottom by projections 26 and 89. When the piston 13 is rotating and descending and the pins 74 engage the bottom of the can, the plate 79 will be rocked by the cup 78 through frictional engagement thereby rocking the shaft 69 and shifting the member 52 of the reversing gear. When the machine is manually actuated the crank 68 above referred to is prevented from being rotated in the wrong direction by the following means. See Figs. 2, 16, 17, 18, and 19.

Attached to the shaft 40 are two ratchets 90 and 91 the teeth of which point in opposite directions. The ratchet 90 is in operative relation with a pawl 92 while the ratchet 91 is in operative relation with a pawl 93. The pawls 93 and 92 are pivoted on pins 94 and are under the control of a spring 95 which tends to place the pawls in engagement with their respective ratchets. When one of the pawls is in engagement with its ratchet, the shaft 40 can only rotate in one certain direction, and when the other pawl is in engagement the said shaft can only rotate in the opposite direction. The pawls 92 and 93 are placed out of operative relation with their ratchets by cam surfaces 96 which are part of a plate 97 swingingly mounted on the shaft 40. The pawls are held out of engagement by latches 99 pivoted at 100 and under the control of a spring 101. The latches 99 are provided with projections 102 adapted to engage projections 103 of the pawls 92 and 93. The said latches are released from engagement with the pawls, thereby allowing their respective pawls to engage their ratchets, by cam surfaces 98. When the plate 97 is rocked to one side, one of the cam surfaces 96 disengages its respective pawl 93 from the ratchet 91 which permits the respective latch 99 to catch and hold its pawl out of operative relation with its ratchet. At the same time the other respective cam surface 98 actuates its respective latch 99 thereby releasing the pawl 92 and permitting the same to come into operative relation with the ratchet 90. When the plate 97 is shifted to the other side the opposite movements take place. The plate 97 is actuated concurrently with the shifting of the clutch member 52 of the reversing gear through the agency of a lever 104, shown in detail in Fig. 18. The lever 104 is pivoted at 105 and is provided with a slot 106, and is actuated by a pin 107 within said slot and mounted on the arm 72. To lock the machine against operation, a pawl 87 is provided. See Figs. 17 and 19. This pawl 87 is pivoted at 86 and is under the control of a spring 108 and a cam 109. The cam 109 is slidingly mounted on a casing 110 and is provided with a finger piece 111 by means of which it is manipulated. When the cam 109 is placed in engagement with one end of the pawl, the said pawl is moved out of engagement with the ratchet thereby permitting the machine to be actuated. The pawl 87 is only adapted to lock the machine when the piston is in a position to dispense the lard. This device is only used when the machine is subject to manual operation. At the same time the lard is being moved into the conveyer chamber 35 by the piston 13, the upper portion thereof is being forced into and through the spout 3 by the screw conveyer 37. The lard is discharged into a measuring cup 112 mounted on the upper end of the said spout. See Figs. 2, 11 and 12. The cup 112 is provided with a piston or actuated means 113 mounted on the lower end of the piston rod 114 which projects out of the top of the said cup. The piston rod 114 is provided with rack teeth 115 which mesh with a pinion 116 mounted on a tubular shaft 117 journaled in bearings 118. The cup 112 supports a casing 119 having an index or indicator scale 120 which reads in connection with a rotating indicator 121 mounted on the shaft 117. The amount of lard in the cup is determined by the indicator 121 and the machine may be stopped when a predetermined amount of lard has been delivered. The lard is discharged from the cup by swinging the same to the side as is fully described in the hereinbefore mentioned patent. To permit the machine to be automatically stopped when a certain or predetermined amount of lard has been delivered, the following means is provided. See Figs. 2, 4, 11, 12, and 13. Mounted within the tubular shaft 117 is a rod 122 which rotates with but which may be set relative to said shaft. The rod 122 is connected to the shaft, by a clutch 123 and is held in a set position by a spring 124 mounted between one end of the shaft 117 and a collar 125 on the rod 122. The end of the rod 122 adjacent to the indicator 121 is provided with a pointer 126 and a thumb-piece 127 by means of which the clutch may be disengaged and the rod relatively rotated. The other end of the said rod carries a trip 128 adapted to engage a projection 129 on the upper end of a vertically movable rod 130. The rod 130 is movable in suitable guides 131 and is pressed upwardly by a spring 132. The lower end of the rod 130 is connected by a rod 133 to a crank 134 mounted on a rock shaft 135. The shaft 135 is mounted in a bearing in the machine casing 4. The shaft 135 extends into the casing 4 and is provided with a bifurcated crank 136 which actuates the clutch 58. The rock shaft 135 also carries an arm 137 which extends out through a slot 138 in the casing and by means of which the machine is started when power-driven. The position of the rod 122 and the trip 128 may be set by the pointer 126 and the position of the trip 128 relative to the projection 129 will determine the amount of lard which the cup 112 will receive before the clutch 58 is thrown out and the machine is stopped. In the position shown in Fig. 12 a full cup of lard will be discharged before the machine is stopped as the trip 128 must make a complete revolution before engaging the top of the projection 129.

The motor circuit is controlled as follows. See Figs. 4 and 24. An electric circuit 139 into which the motor 57 is connected is provided with terminal switch points 140 adapted to be connected by a member 141 mounted on and insulated from the arm 137. When the arm 137 is depressed, the clutch 58 is set and the circuit is closed at the switch points 140. When the arm 137 is elevated the clutch is released and the circuit is broken which allows the motor to spin after the machine has stopped.

The indicator 121 is illuminated by an illuminator or shaded lamp 142 mounted on the top of the casing 119, Fig. 1. The lamp 142 is in parallel with the motor circuit by wires 143. The wires 143 are provided with a switch consisting of brushes 144 mounted on and insulated from the cup 112. The brushes are adapted to be electrically connected by a drum or segment switch 145 mounted on the shaft 117. The drum 145 is provided with an insulated portion 146 which breaks the circuit when the brushes are in contact therewith. When the piston 113 is in a normal position, the circuit is broken but when the machine begins to discharge the lard, the circuit will be closed and the indicator will be illuminated, thereby permitting the indicator to be read. The circuit will be opened when the piston is manually returned to a normal position when the lard is discharged from the cup.

To prevent the formation of a partial vacuum under the piston during the upward movement thereof, the piston rod 15 is provided on its lower end with a sharp projection 147 adapted to pierce the bottom of the can and permit the air to enter. To prevent the can 6 being disturbed and drawn upward during the upward movement of the piston, it is clamped to the plate 7 by bands 148. The bands are attached to the plate by posts 149 and are clamped to the can by a bolt 150. To permit of the insertion of the can, the bands may be sprung to the side and may be held in such position by projections 151 on the inside of the base.

The operation of the machine is as follows: with the parts in the position shown in Fig. 2 the piston 13 is at the bottom of the lard can 6, chamber 35 and spout 3 are filled with lard. When it is desired to dispense a quantity of lard, the thumb piece 127 (Fig. 11) is drawn out and rotated until the pointer 126 indicates the selected quantity. This movement sets the automatic trip 128. The lever 137 (Fig. 13) is then depressed (it being shown in that position). This movement sets the clutch 58 and closes the motor circuit at the switch 140. The piston 13 will then be moved upward by the motor through the following train of mechanism (Figs. 2 and 13). Piston rod 15, yoke 18, screw shaft 19, nut 21, gears 20 and 39, shaft 40, chain 43, sleeve 45, chain 47, shaft 49, reversing gear 51, shaft 50, gears 59 and 54, shaft 55 and the clutch 58 which is connected to the motor. At the time the piston is moving upward the conveyer 37 is rotated through the agency of the ratchet 62 and pawl 61 (Fig. 20). These movements force the lard out through the spout 3 and into the cup 112 (Fig. 11) thereby elevating the piston 113. When the piston 113 is elevated the rack 115 of the piston rod 114 thereof rotates the pinion 116, shaft 117, indicating dial 121, clutch 123, rod 122 and trip 128. When the cup 112 receives the predetermined quantity of lard, the trip 128 will engage the projection 129 which will release the clutch 58 and break the motor circuit through the agency of the rod 130 and 133, shaft 135 and levers 136 and 137. This movement stops the movement of the lard and permits the motor to continue spinning after the clutch has been disconnected. The lard is removed from the cup in a manner fully described in the hereinbefore mentioned patent and which forms no part of the present improvements. When the piston 13 after continued dispensing operations passes the top of the can, the empty can may be removed and a full one substituted lard in the meantime being dispensed from the chamber 35. The can 6 is removed by releasing the bands 148 and dropping the plate 7 by disengaging the lever 10 from the projection 11. When a new can is inserted the reverse operations take place. The full can will have been inserted in the base 1 by the time the piston reaches the limit of its upward movement. When this limit is reached, the projection 71 will trip the projection 70 thereby shifting the member 52 (Fig. 14) of the reversing gear 51 through the agency of arm 68 and lever 66 (Fig. 4). The screw shaft 19 will then descend and rotate in the opposite direction. This movement not only depresses the piston 13 but rotates the same through the agency of the clutch members 23, 24 and 30 (Fig. 6). During the rotating descending movement of the piston it augers itself through the lard to the bottom of the can. When the piston reaches the bottom of the can, the pins 74 (Fig. 6) in the head thereof strike the bottom of the can, and the pressure thereagainst, due to the descending piston, will force the pins 74 against the member 75 which in turn, through the agency of the sleeve 77, forces the cup 78 against the plate 79 and partially rotates the same through the agency of friction. This movement of the plate 79 rocks a plate 81 (Fig. 9) which engages a rod 85 and rocks the shaft 69 thereby shifting the member 52 of the reverse gear 51 in a direction opposite that in which it was shifted when the projection 71 engaged the projection 70.

The piston will then move upward without rotation thereby dispensing the lard. The machine is manually operated by attaching a crank to the projection 65. When thus actuated the crank is prevented from being rotated in the wrong direction by reverse ratchets 90 and 91 and pawls 92 and 93 (Fig. 16). The pawls are controlled by a swinging plate 97 actuated from the shaft 69 by a lever 104 (Fig. 18).

Having described my invention I claim:

1. A lard dispensing mechanism including a vertically reciprocable piston and a spiral conveyer receiving the lard therefrom, a motor connected to said dispensing mechanism and reversing mechanism mounted between said motor and said dispensing mechanism and actuated by said dispensing mechanism.

2. A lard dispensing mechanism including a reciprocating member to initially discharge the lard from a container and a member to receive the lard from said first named member and discharge it from the machine, a motor adapted to drive said dispensing mechanism, reversing mechanism mounted between said motor and said dispensing mechanism and actuated by said reciprocating member at each end of its movement.

3. In a lard dispensing mechanism having a member rotatably movable in one direction and non-rotatably movable in the other direction, a motor connected to said dispensing mechanism, a reverse gear mounted between said member and said motor whereby said member is reversed at each end of its movement.

4. In dispensing mechanism having an auger-like piston, said piston being rotatably movable in one direction and non-rotatably movable in the other direction, a motor connected to said dispensing mechanism, a reverse gear mounted therebetween, and trip mechanism mounted between said piston and said reversing gear whereby said piston is reversed at each end of its movement.

5. In dispensing mechanism having an auger-like piston, and a screw conveyer, said piston being rotatably movable in one direction and non-rotatably movable in the other direction, a motor connected to said dispensing mechanism, a reverse gear mounted therebetween, and trip mechanism mounted between said piston and said reversing gear whereby said piston is reversed at each end of its movement.

6. In dispensing mechanism having an auger-like piston, and a screw conveyer, said piston being rotatably movable in one direction and non-rotatably movable in the other direction, a motor connected to said dispensing mechanism, a reverse gear mounted therebetween, trip mechanism mounted between said piston and said reversing gear whereby said piston is reversed at each end of its movement, and ratchet mechanism mounted between said conveyer and said motor whereby said conveyer is actuated in one direction only.

7. In a dispensing machine having an auger-like piston, means for driving said piston, a reverse gear mounted therebetween, and an actuating member carried by said piston connected to said reverse gear and adapted to stop the travel of the piston when said member engages a stationary abutment.

8. In a dispensing machine, an auger-like piston, means for driving said piston, a reverse gear mounted therebetween, an actuating member carried by said piston, and a friction device connecting said gear and said actuator whereby the travel of the piston is stopped when said actuator engages a rigid abutment.

9. In a dispensing machine, an auger-like piston, means for driving said piston, a reverse gear mounted therebetween, an actuator carried by said piston, a connecting member in operative relation with said actuator, and a friction device mounted between said reverse gear and said connecting member whereby the travel of the piston is stopped when the actuator strikes a rigid abutment.

10. In a lard dispensing machine, a piston adapted to initially discharge lard from a container, a spiral conveyer lying across the path of said piston and receiving the lard therefrom, means for driving said piston and conveyer, a reverse gear mounted between said driving means and said piston and conveyer, and means carried by said driving means and adapted to actuate said reverse gear whereby the travel of the piston is stopped when it reaches the end of its movement.

11. In a lard dispensing machine, a piston adapted to initially discharge lard from a container, a spiral conveyer adapted to receive the lard from said piston, means for driving said piston and conveyer, a reverse gear mounted between said driving means and said piston and conveyer, and a trip carried by said driving means and adapted to actuate said reverse gear whereby the travel of the piston is stopped when it reaches the end of its movement.

12. In a dispensing machine, a piston adapted to initially discharge lard from a container, a conveyer receiving the lard from said piston, means including a screw shaft for driving said piston, a reverse gear mounted between said driving means and said piston, and a trip carried by said screw shaft and adapted to actuate said reverse gear whereby the travel of the piston is stopped when it reaches the end of its movement.

13. In a dispensing machine having a piston, means including a screw shaft for driving said piston, a reverse gear having latch mechanism mounted therebetween, and a trip carried by said shaft and adapted to engage said latch whereby the travel of the piston is stopped when it reaches the end of its movement.

14. In a dispensing machine adapted to dispense lard, means for driving the same, a swinging cup adapted to receive the lard, means mounted in said cup and moved by the force of the lard entering therein, and means connecting said driving means and said lard actuated means whereby the machine is stopped when the cup receives a certain quantity of lard.

15. In a machine adapted to dispense lard, means for driving the same, a swinging cup adapted to receive the lard, means mounted in said cup and moved by the lard entering therein, and adjustable means connecting said driving means and said lard actuated means whereby the machine is stopped when the cup receives a certain quantity of lard.

16. In a machine adapted to dispense lard, means for driving the same, a swinging cup adapted to receive the lard, means in said cup moved by the lard entering therein, adjustable means connecting said driving means and said lard actuated means, and an indicator coöperating therewith, whereby the machine is stopped when the cup receives the predetermined quantity of lard.

17. In a machine adapted to dispense lard, a member adapted to initially discharge lard from a container, a conveyer receiving the lard from the said member, means including a clutch for driving said machine, a swinging cup adapted to receive the lard from the conveyer, means moved by the lard entering therein to indicate the quantity of lard, and means connecting said clutch and said lard actuated means whereby the clutch is opened and the machine is stopped when the cup receives a certain quantity of lard.

18. In a machine adapted to dispense lard, a lard discharging piston, means including a clutch and switch for driving said piston, a hinged cup adapted to receive lard, means mounted in said cup and moved by the lard entering therein, and means connecting said clutch and switch with said lard actuated means whereby said clutch and switch are opened and the machine is stopped when the cup receives a certain quantity of lard.

19. In a machine adapted to dispense lard, a lard dispensing piston, means including a clutch for driving the said piston, a cup adapted to receive lard from the said piston, a piston mounted in the cup and moved by the lard entering said cup, and means connecting the said last named piston and clutch whereby the clutch is opened when the machine receives any predetermined quantity of lard.

20. In a machine adapted to dispense lard, a lard discharging piston, means including a clutch for driving the said piston, a cup adapted to receive lard, a piston mounted in the said cup and moved by the lard entering said cup, a trip actuated by the last named piston, and means adapted to be engaged by the trip and connected to the clutch whereby the clutch is opened when the cup receives a certain quantity of lard.

21. In a machine adapted to dispense lard, a lard discharging piston, means including a clutch for driving the said piston, a cup adapted to receive lard therefrom, a piston in the cup moved by the lard when a full predetermined measure has entered said cup, an adjustable trip actuated by the last named piston, and means arranged to be engaged by the trip and connected to the clutch whereby the clutch is opened when the cup receives a predetermined quantity of lard.

22. In a machine adapted to dispense lard, a lard discharging piston, means including a clutch for driving the piston, a cup adapted to receive lard from said machine, a piston in said cup moved by lard entering said cup, a hollow shaft moved by the last named piston, a rod and trip carried by said shaft, and means arranged to be engaged by the trip and connected to said clutch whereby said clutch is opened when the cup receives a certain quantity of lard.

23. In a machine adapted to dispense lard, a lard dispensing piston, means including a clutch for driving the said piston, a cup adapted to receive lard from said piston, a piston in said cup moved by lard entering said cup, a hollow shaft moved by the last named piston, a rod and trip carried by said shaft, computing indicating means for setting said trip, and means adapted to be engaged by the trip and connected to said clutch whereby said clutch is opened when the cup receives a certain quantity of lard.

24. In a machine adapted to dispense lard, a lard discharging piston, means including a clutch for driving the machine, a cup adapted to receive the lard dispensed by the said piston, a piston in said cup, a hollow shaft actuated by said last named piston, a rod and trip carried by said shaft, adjustable connecting means between said shaft and rod, a computing indicator for setting said trip, and means adapted to be engaged by the trip and connected to said clutch whereby the clutch is opened when the cup receives a predetermined quantity of lard.

In testimony whereof I affix my signature.

HARRY W. WILLIAMS.